United States Patent
Proulx

(10) Patent No.: US 7,961,599 B2
(45) Date of Patent: Jun. 14, 2011

(54) PSEUDOWIRE TUNNEL REDUNDANCY

(75) Inventor: Denis Armand Proulx, Kanata (CA)

(73) Assignee: Alcatel Lucent, Paris (FR)

( * ) Notice: Subject to any disclaimer, the term of this patent is extended or adjusted under 35 U.S.C. 154(b) by 144 days.

(21) Appl. No.: 12/397,021

(22) Filed: Mar. 3, 2009

(65) Prior Publication Data

US 2010/0226246 A1    Sep. 9, 2010

(51) Int. Cl.
    *G06F 11/00*    (2006.01)
(52) U.S. Cl. .......... 370/218; 370/242; 370/244
(58) Field of Classification Search .......... None
    See application file for complete search history.

(56) References Cited

U.S. PATENT DOCUMENTS

| | | | |
|---|---|---|---|
| 7,343,423 B2* | 3/2008 | Goguen et al. | 709/239 |
| 7,558,194 B2* | 7/2009 | Regan et al. | 370/217 |
| 7,643,409 B2* | 1/2010 | Voit et al. | 370/218 |
| 7,724,651 B2* | 5/2010 | Washam et al. | 370/217 |
| 7,808,919 B2* | 10/2010 | Nadeau et al. | 370/248 |
| 2003/0095554 A1* | 5/2003 | Shimizu | 370/395.53 |
| 2004/0133619 A1* | 7/2004 | Zelig et al. | 709/200 |
| 2009/0154339 A1* | 6/2009 | Zi | 370/217 |
| 2009/0175280 A1* | 7/2009 | Berechya et al. | 370/395.53 |
| 2009/0245261 A1* | 10/2009 | Khan et al. | 370/395.53 |
| 2010/0165832 A1* | 7/2010 | Kini et al. | 370/217 |

OTHER PUBLICATIONS

Bryant, E. et al., "Pseudo Wire Emulation Edge-to-Edge (PWE3) Architecture" NWG, RFC No. 3985 Cisco Systems, Standards Track, Overture Networks, Inc., Mar. 2005.

* cited by examiner

*Primary Examiner* — Donald L Mills
(74) *Attorney, Agent, or Firm* — Kramer & Amado, PC

(57) ABSTRACT

The invention is directed to providing pseudowire tunnel redundancy for VPLS and VLL services in the form of automatic protection switching of the service from a primary pseudowire tunnel to a backup pseudowire tunnel upon detection of a failure affecting the primary pseudowire tunnel. Embodiments of the invention monitor event notifications reported by a network management entity for an indication of a failure affecting the primary pseudowire tunnel; and responsive to detecting the indication, switch a service carried by the primary pseudowire tunnel to the backup pseudowire tunnel. Such event notifications include those corresponding to any of provider edge routers, interface ports, service access points, spokes, and tunnel endpoints that are related to operation of the primary pseudowire tunnel.

20 Claims, 2 Drawing Sheets

PSEUDOWIRE TUNNEL REDUNDANCY

FIELD OF THE INVENTION

The invention is directed to packet switching communication networks, particularly providing automated protection switching on a Layer-2 pseudowire tunnel.

BACKGROUND OF THE INVENTION

Virtual Leased Line (VLL) is a service for providing Ethernet based point to point communication over Internet Protocol (IP) and Multi Protocol Label Switching (MPLS) networks (IP/MPLS). This technology is also referred to as Virtual Private Wire Service (VPWS) or Ethernet over MPLS (EoMPLS). The VPWS service provides a point-to-point connection between two Customer Edge (CE) routers. It does so by binding two attachment circuits (AC) to a pseudowire that connects two Provider Edge (PE) routers, wherein each PE router is connected to one of the CE routers via one of the attachment circuits. VLL typically uses pseudowire encapsulation for transporting Ethernet traffic over an MPLS tunnel across an IP/MPLS backbone. More information on pseudowires can be found in "Pseudo Wire Emulation Edge-to-Edge (PWE3) Architecture", RFC3985, IETF, March 2005, by S. Bryant and P. Pate.

Virtual Private LAN Service (VPLS) is an Ethernet service that effectively implements closed user groups via VPLS instantiations. In order to achieve full isolation between the user groups, VPLS dedicates a separate forwarding information base (FIB) on network routers per VPLS instance. Each VPLS instance further requires that a dedicated mesh of pseudowire tunnels is provisioned between PE routers that are part of the VPLS.

Both VLL and VPLS services use Service Access Points (SAP) to bind tunnel endpoints at PE routers ports to their respective service. For example, in the case of VPLS service a SAP would specify physical identifiers (e.g. node, shelf, card, port) of the corresponding port and an identifier (e.g. VLAN5) of the VPLS.

In order to offer highly reliable VLL and VPLS service it is necessary to protect against pseudowire tunnel failures, which for example could result from a failure at a PE router at either end of a pseudowire tunnel or any intermediate router through which the tunnel passes. Ideally, this protection would be in the form of automatic protection switching at a PE router to a redundant tunnel upon detection of a failure affecting a primary tunnel. Unfortunately, not all PE routers have the capability to provide this form of protection on all types of pseudowire tunnels. Therefore, a means of providing pseudowire tunnel redundancy that does not depend on the tunnel redundancy capabilities of a router is desired.

SUMMARY OF THE INVENTION

The invention is directed to providing pseudowire tunnel redundancy for VPLS and VLL services in the form of automatic protection switching of the service from a primary pseudowire tunnel to a backup pseudowire tunnel upon detection of a failure affecting the primary pseudowire tunnel.

Some embodiments of the invention record identifiers of selected pseudowire tunnels, the tunnels further identified as being one of either a primary tunnel or a backup tunnel for a corresponding primary tunnel; monitor event notifications reported by a network management entity for an indication of a failure affecting one of the selected primary pseudowire tunnels; and responsive to detecting the indication, switch a service carried by the primary pseudowire tunnel affected by the failure to a corresponding backup pseudowire tunnel.

In some embodiments of the invention switching a service to a backup pseudowire tunnel includes making a determination as to the type of service. Responsive to the service being a VPLS service, the affected primary pseudowire tunnel is automatically put in an administration down state via the management entity, which state means the tunnel is taken out of service. Responsive to the service being a VLL service, a VLL spoke at a PE router at one end of the affected primary pseudowire tunnel is automatically removed and another VLL spoke to the backup pseudowire tunnel is automatically added at the PE router.

In some embodiments of the invention switching a service to a backup pseudowire tunnel includes automatically verifying operational status of the backup pseudowire tunnel via the management entity and performing the switching operation responsive to a result of the verification indicating that the backup pseudowire tunnel is operational. The verification may optionally include verifying status of the service and any SAPs binding the tunnel endpoints to the service. The verification may further include running a diagnostic test on the backup pseudowire tunnel, such as verifying that an OAM packet generated by the management entity can be adequately communicated over the backup pseudowire tunnel from one endpoint of the tunnel to another.

In some embodiments of the invention switching a service to a backup pseudowire tunnel includes automatically checking a customer rules database for a preferred action in the event of a failure affecting one of the selected primary pseudowire tunnels and performing the switching in accordance with the preferred action specified in the database.

Advantageously, embodiments of the invention can be used to provide pseudowire tunnel redundancy for VPLS and VLL services irrespective of whether or not PE routers carrying those services have the capability to provide pseudowire tunnel redundancy.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
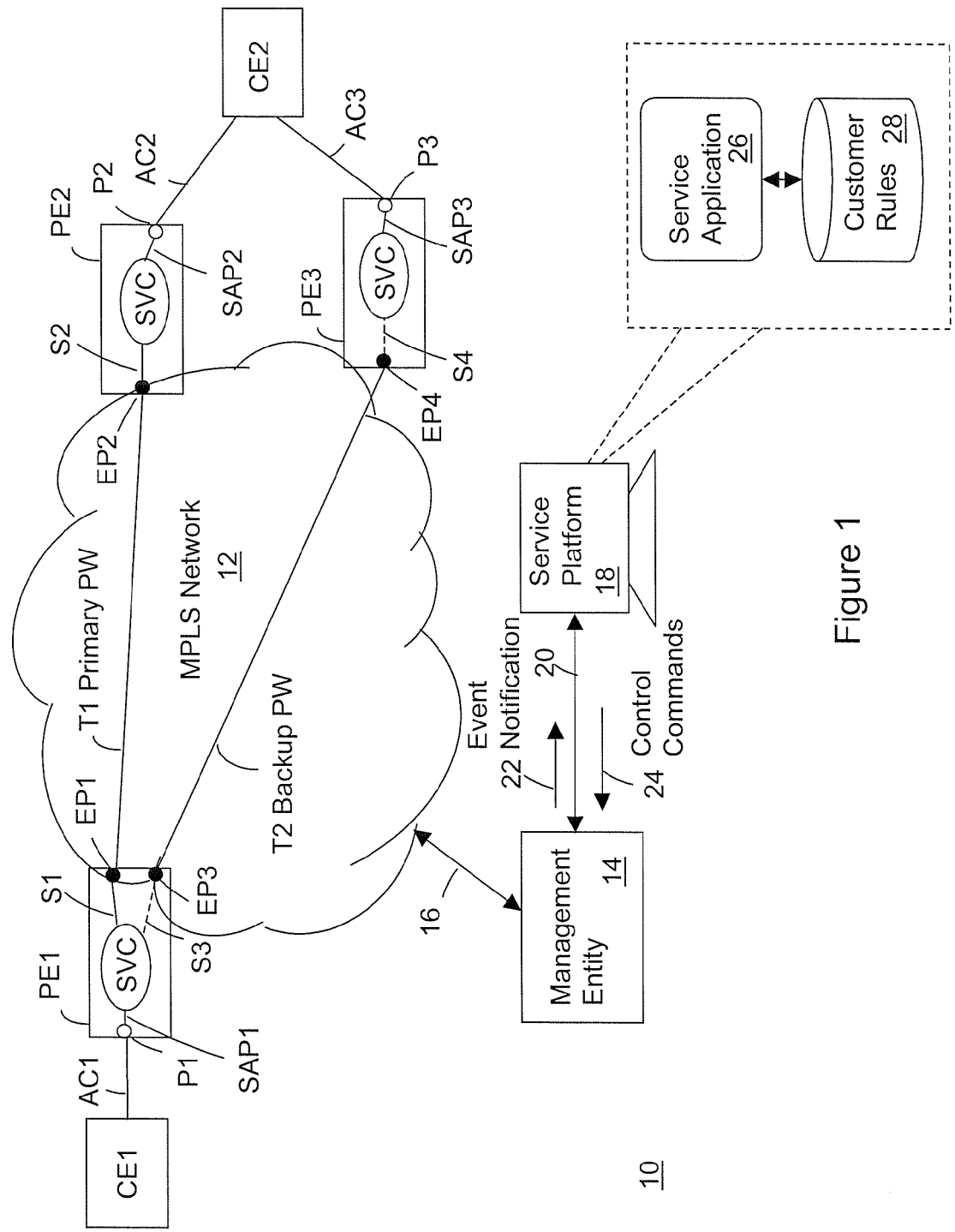
FIG. 1 illustrates a network configuration for providing pseudowire tunnel redundancy for a VLL service according to an embodiment of the invention.

Referring to FIG. 1, a network configuration 10 for providing pseudowire tunnel redundancy for a VLL service over an MPLS network 12 includes a primary pseudowire tunnel T1 routed through the MPLS network 12 between a first provider edge router PE1 and a second provider edge router PE2. The primary pseudowire tunnel T1 has two endpoints EP1, EP2, the first endpoint EP1 being at the first provider edge router PE1 and the second endpoint EP2 being at the second provider edge router PE2. An instance of the VLL service SVC is instantiated at each of the provider edge routers PE1, PE2. A first VLL spoke S1 logically associates the first tunnel endpoint EP1 with the VLL service instantiation SVC at the first provider edge router PE1. A second VLL spoke S2 logically associates the second tunnel endpoint EP2 with the VLL service instantiation SVC at the second provider edge router PE2. Accordingly, data packets associated with the VLL service SVC are communicated through the MPLS network 10 via the primary pseudowire tunnel T1 between the first and second provider edge routers PE1, PE2.

A first customer edge router CE1 is connected to a first interface port P1 of the first provider edge router PE1 via a first attachment circuit AC1. A first service access point SAP1 logically associates the first interface port P1 with the VLL service SVC, such that data packets received at the first port P1 from the first attachment circuit AC1 that are associated with the VLL service SVC are forwarded to the primary pseudowire tunnel T1 via the first VLL spoke S1. Similarly, data packets associated with the VLL service SVC received by the first provider edge router PE1 from the primary pseudowire tunnel T1 are forwarded to the first interface port P1 via the first service access point SAP1.

Similarly, a second customer edge router CE2 is connected to a second interface port P2 of the second provider edge router PE2 via a second attachment circuit AC2. A second service access point SAP2 logically associates the second interface port P2 with the VLL service SVC, such that data packets received at the second port P2 from the second attachment circuit AC2 that are associated with the VLL service SVC are forwarded to the primary pseudowire tunnel T1 via the second VLL spoke S2. Similarly, data packets associated with the VLL service SVC received by the second provider edge router PE2 from the primary pseudowire tunnel T1 are forwarded to the second interface port P2 via the second service access point SAP2.

In view of foregoing it should be clear that data packets associated with the VLL service SVC can be communicated between the first and second customer edge routers CE1, CE2 via their respective attachment circuits AC1, AC2, the first and second provider edge routers PE1, PE2, and the primary pseudowire tunnel T1. However, as previously mentioned it is often desirable to provide this service connectivity in a highly reliable manner, for which purpose a backup pseudowire tunnel T2 is employed to protect against failures that affect the operation of the primary pseudowire tunnel T1.

The backup pseudowire tunnel T2 is routed through the MPLS network 10 between the first provider edge router PE1 and a third provider edge router PE3. A third endpoint EP3 at the first provider edge router PE3 is associated with the backup pseudowire tunnel T2 and a fourth endpoint EP4 at the third provider edge router PE3 is also associated with the backup pseudowire tunnel T2. An instance of the VLL service SVC is instantiated at the third provider edge router PE3.

The customer edge router CE2 is connected to the third provider edge router PE3 via a third attachment circuit AC3 connected to a third interface port P3 at the third provider edge router PE3. In a similar manner as described earlier for the first and second service access points SAP1, SAP2, a third service access point SAP3 associates the third interface port P3 with the VLL service instantiated on the third provider edge router PE3.

With the foregoing network configuration, in the event of a failure occurring that affects the operation of the primary pseudowire tunnel T1, the VLL service SVC can be switched to the backup pseudowire tunnel T2. After this switching operation has occurred, data packets associated with the VLL service SVC will be communicated between the first and second customer edge routers CE1, CE2 via the via the first and third attachment circuits AC1, AC3, the first and third provider edge routers PE1, PE3, and the backup pseudowire tunnel T2. However, in order to implement this switching operation, additional functionality in the network configuration 10 is needed when the provider edge routers PE1, PE2, PE3 do not have the capability to provide pseudowire tunnel redundancy.

Still referring to FIG. 1, the network configuration 10 includes a management entity 14 that is communicatively coupled to the provider edge routers PE1, PE2, PE3 via a control connection 16 and the MPLS network 12. The management entity 14 would typically be a network management system capable of performing operation, administration and maintenance (OAM) type functions on network elements in the MPLS network 12 such as the provider edge routers PE1, PE2, PE3. This functionality of the management entity 14 includes the capability to receive reports of equipment, service, and provisioning related events from network elements of the MPLS network 12, including event reports from the first and second provider edge routers PE1, PE2 regarding any failure affecting the operation of the primary pseudowire tunnel T1.

The network configuration 10 also includes a service platform 18 that is communicatively coupled to the management entity 14 via an open operating system (OS) interface 20. Using the open OS interface 20, the service platform 18 has access to event notifications 22, which include event notifications related to the event reports from the network elements. Further using the open OS interface 20 the service platform 18 can issue OAM control commands 24 to the management entity 14 including commands to effect provisioning changes at the provider edge routers PE1, PE2, PE3. The service platform 18 would typically be a laptop or desktop computer or workstation. The open OS interface is a Java message service (JMS) interface; although other types of message interfaces could be used.

The service platform 18 executes a service application 26 that is in communication with customer rules 28 stored on the service platform 18, although the customer rules could also be stored on the management entity 14 with access to them given by the open OS interface 20. The service application 26 is a software program that embodies a method of providing pseudowire tunnel redundancy.

According to the method, the service application 26 monitors event notifications 22 received over the open OS interface 20. The service application 26 checks the event notifications to determine if any of them relate to a pseudowire tunnel that has been provisioned for pseudowire tunnel redundancy, for example the primary pseudowire tunnel T1. Typically, the provisioning would be done at the service platform 18 and the provisioning information would be stored in the customer rules 28 and would include identification of the corresponding backup pseudowire tunnel (e.g. T2). Responsive to determining that an event notification indicates the event of a failure affecting the operation of a primary pseudowire tunnel (e.g. T1), the service application 26 issues control commands 24 to switch the VLL service to the corresponding backup pseudowire tunnel (e.g. T2).

Still referring to FIG. 1, the service application 26 effects the switchover of the VLL service SVC from the primary pseudowire tunnel T1 to the backup pseudowire tunnel T2 by issuing control commands 24. These commands delete the first and second VLL spokes S1, S2 provisioned at the first and second provider edge routers PE1, PE2 respectively, and then add two new VLL spokes to the backup pseudowire tunnel T2 at the first and third provided edge routers PE1, PE3. Accordingly, the service application 26 issues control commands 24 to add a third VLL spoke S3 that logically associates the third tunnel endpoint EP3 with the VLL service instantiation SVC at the first provider edge router PE1. Similarly, a fourth VLL spoke S4 is added that logically associates the fourth tunnel endpoint EP4 with the VLL service instantiation SVC at the third provider edge router PE3. The third and fourth VLL spokes S3, S4 are shown as dashed lines in FIG. 1. After these provisioning changes have been made, data packets associated with the VLL service SVC will be communicated between the first and second customer routers CE1, CE2 via the via the first and third attachment circuits AC1, AC3, the first and third provider edge routers PE1, PE3, and the backup pseudowire tunnel T2.

Figure 2:
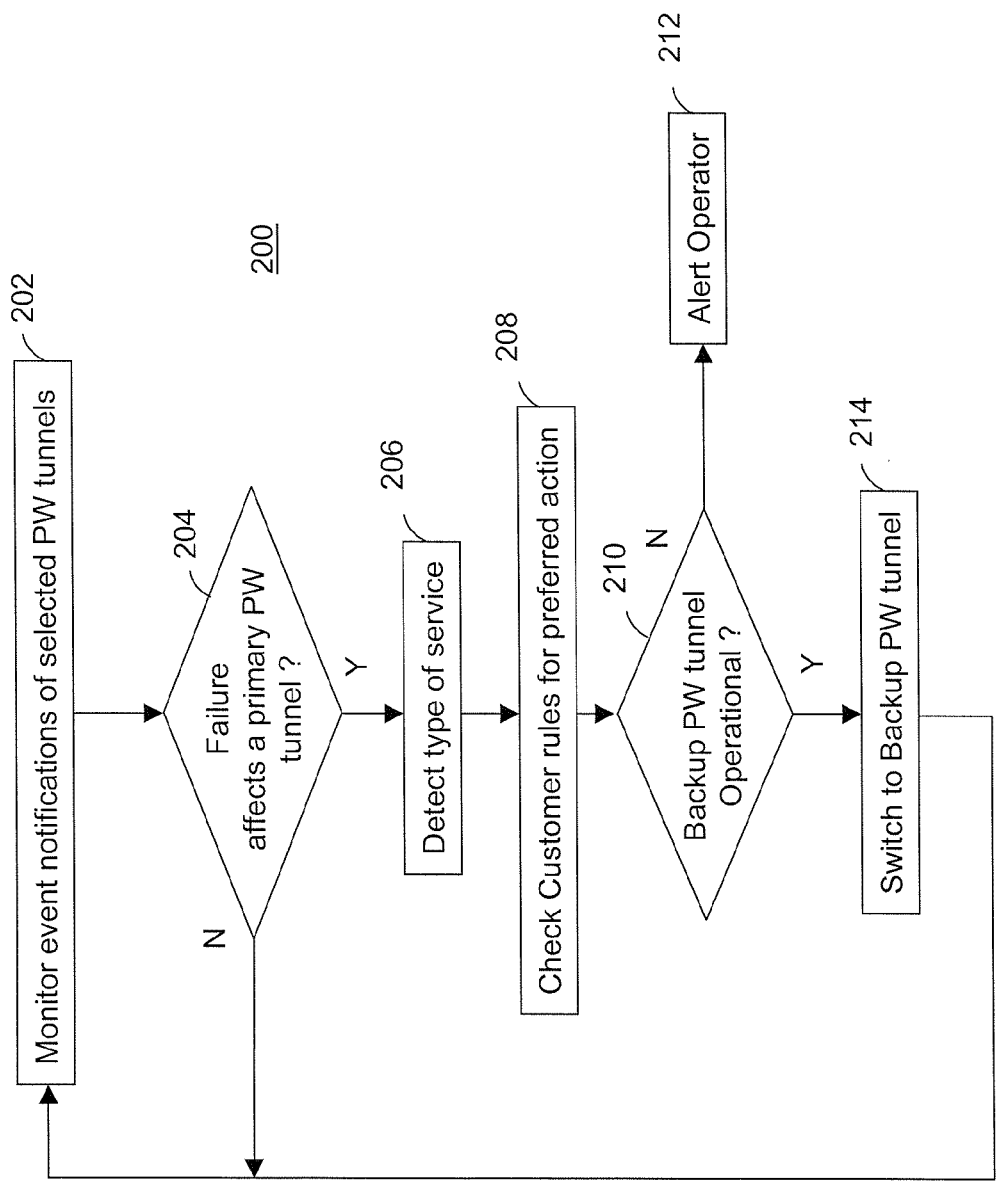
FIG. 2 illustrates a method of providing pseudowire tunnel redundancy according to the embodiment depicted in FIG. 1.

Referring to FIG. 2, a method 200 of providing pseudowire tunnel redundancy will now be described with additional reference to FIG. 1. The method 200 includes monitoring 202 event notifications of selected pseudowire tunnels. Selection of the pseudowire tunnels would preferably be performed using the service application 26, but could also be performed by another application running on the service platform 18 or management entity 14. Recordation of these selections would preferably be stored at the service platform 18, e.g. in the customer rules 28, but they could also be stored at the management entity 14, or in both locations. It is sufficient for performing the method 200 that an indication of pseudowire tunnels to be monitored is available to an entity such as the service application 26 that performs the method 200 automatically without human intervention. Such indication would include which pseudowire tunnels are primary pseudowire tunnels and which are their corresponding backup pseudowire tunnels. The event notifications are monitored by receiving event notifications 22 from the management entity 14 via the open OS interface 20.

A determination 204 is made whether or not an event notification of a selected pseudowire tunnel indicates a failure that affects operation of a primary pseudowire tunnel. That is, a determination is made whether the event notification corresponds to an event that affects the operation of a pseudowire tunnel and whether the affected pseudowire tunnel is a primary pseudowire tunnel. This event could be any event that affects the operation of a provider edge router e.g. PE1, interface port e.g. P1, service access point e.g. SAP1, VLL spoke e.g. S1, tunnel endpoint e.g. EP1, and the primary pseudowire tunnel itself e.g. T1. That is, even an event that is not directly associated with the selected primary pseudowire tunnel itself can affect the operation of the primary pseudowire tunnel. The service application 26 has information relating event notifications 22 to the effect of their respective events on the operation of a corresponding pseudowire tunnel in order to make the determination 204. This information could be stored in the customer rules database 28, in the management entity 14, or even logically coded in the service application 26 itself by type of event notification; the specific event notifications of interest to be determined after a primary pseudowire tunnel has been selected for monitoring.

For example, after the primary pseudowire tunnel T1 has been selected for monitoring, the service application 26 accesses the management entity 14 to determine object identifiers of any provider edge routers e.g. PE1, interface ports e.g. P1, service access points e.g. SAP1, VLL spokes e.g. S1, and tunnel endpoints e.g. EP1, are related to the operation of the primary pseudowire tunnel T1. Typically the service application 26 would issue command language interface (CLI) commands to the management entity 14 to read provisioning information related to the primary pseudowire tunnel T1, which provisioning information would include the desired object identifiers. These object identifiers of the related PE routers, interface ports, SAPs, VLL spokes, tunnel endpoints and service instances are stored in the customer rules database 28. The service application 26 monitors the event notifications 22 to detect any event notification that corresponds to these object identifiers or that of the primary pseudowire tunnel. In the event that such an event notification is detected, the determination 204 is affirmative; otherwise the determination 204 is negative. In the case where the determination 204 is negative, i.e. the failure does not affect a selected primary pseudowire tunnel, the method returns to monitoring 202 event notifications 22.

However, in the case where the determination 204 is affirmative, i.e. the failure affects operation of a selected pseudowire tunnel; the type of service carried by the affected pseudowire tunnel is detected 206. Then the customer rules 28 are checked 208 for a preferred action to be performed. The preferred action could be dependent on the type of service being carried by the affected pseudowire tunnel. A determination 210 is made whether the backup pseudowire tunnel is operational. In the case where the backup pseudowire tunnel is not operational an operator is alerted 212 so that corrective action can be taken manually if necessary. Otherwise, if the backup pseudowire tunnel is operational, the service is switched to the backup pseudowire tunnel. Afterwards, the method 200 resumes to monitoring 202 event notifications of selected pseudowire tunnels.

In the foregoing examples the service has been a VLL service; however it could also be a VPLS service. In the case of a VLL service, switching the VLL service over to the backup pseudowire tunnel T2 was accomplished by deleting the VLL spokes S1, S2 associated with the primary pseudowire tunnel T1 and adding VLL spokes S3, S4 associated with the backup pseudowire tunnel T2. If the service were a VPLS service, switching the service to the backup pseudowire tunnel T2 would be accomplished by putting the primary pseudowire tunnel T1 in an administrative down state. In both cases, these changes are effected automatically by the service application 26 via control commands 24 issued to the management entity 14 over the open OS interface 20 without human intervention.

Numerous modifications, variations and adaptations may be made to the embodiment of the invention described above without departing from the scope of the invention, which is defined in the claims.

What is claimed is:

1. A method of providing pseudowire tunnel redundancy in a packet switching network, comprising:
   recording a first identifier of a primary pseudowire tunnel and a second identifier of a backup pseudowire tunnel for the primary pseudowire tunnel;
   monitoring event notifications reported by a network management entity over an operating system interface;
   determining that one of said event notifications indicates a failure has occurred that affects operation of the primary pseudowire tunnel; and
   automatically switching a service carried by the primary pseudowire tunnel to the backup pseudowire tunnel upon detection of the failure in a service platform.

2. The method of claim 1, wherein the step of recording further comprises:
   determining, from the network management entity, object identifiers of any provider edge routers, interface ports, service access points, spokes, and tunnel endpoints that are related to operation of the primary pseudowire tunnel; and
   recording the object identifiers.

3. The method of claim 2, wherein the step of determining further comprises:
   detecting an event notification that corresponds to one of the object identifiers.

4. The method of claim 3, wherein the step of recording further comprises:
storing one or more of the first identifier, the second identifier, and the object identifiers in a customer rules database.

5. The method of claim 4, wherein the step of switching further comprises:
checking the customer rules database for a preferred action to be taken in response to a failure affecting operation of the primary pseudowire tunnel.

6. The method of claim 3, wherein the step of switching further comprises:
putting the primary pseudowire tunnel in an administrative down state via the network management entity when the service is a virtual private local area network service.

7. The method of claim 3, wherein the step of switching further comprises:
removing a spoke at each end of the primary pseudowire tunnel; and
adding another spoke at each end of the backup pseudowire tunnel when the service is a virtual leased line service.

8. The method of claim 3, wherein the step of switching further comprises:
confirming, via the network management entity, that the backup pseudowire tunnel is operational.

9. The method of claim 8, wherein the step of confirming further comprises:
verifying that service access points binding tunnel endpoints of the backup pseudowire tunnel to the service are operational.

10. The method of claim 8, wherein the step of confirming further comprises:
verifying that an operation administration and maintenance packet generated by the network management entity can be communicated over the backup pseudowire tunnel.

11. A system for providing pseudowire tunnel redundancy to a primary pseudowire tunnel via a backup pseudowire tunnel in a packet switching network, comprising:
a service platform for executing a service application stored thereon, the service platform comprising:
means for communicatively coupling to a network management entity of the packet switching network via an operating system interface; and
a customer rules database for storing one or more of a first identifier of the primary pseudowire tunnel, a second identifier of the backup pseudowire tunnel, and object identifiers of any provider edge routers, interface ports, service access points, spokes, and tunnel endpoints that are related to operation of the primary pseudowire tunnel, wherein the service application comprises instructions recorded on computer readable media to be executed by the service platform for monitoring event notifications reported by the network management entity over the operating system interface; determining that one of said event notifications indicates a failure has occurred that affects operation of the primary pseudowire tunnel; and automatically switching a service carried by the primary pseudowire tunnel to the backup pseudowire tunnel upon detection of the failure in the service platform.

12. The system of claim 11 wherein the service application further comprises:
instructions for determining the object identifiers from the network management entity.

13. The system of claim 12, wherein the means for communicatively coupling are a Java message service open operating system interface.

14. A Multi Protocol Label Switching (MPLS) network, the MPLS network comprising:
a first provider edge (PE) router;
a second PE router coupled to the first PE router by a primary pseudowire (PW);
a third PE router coupled to the first PE router by a backup PW;
a management entity coupled to the first PE router, the second PE router, and the third PE router via a control connection;
a service platform communicatively coupled to the management entity via an open operating system (OS) interface, wherein the service platform switches services between the primary PW and the backup PW via control commands issued to the management entity over the open OS interface.

15. The MPLS network of claim 14, wherein the service platform further comprises:
at least one service application; and
a customer rules database.

16. The MPLS network of claim 14, wherein the service platform issues Operation, Administration, and Maintenance (OAM) control commands to the management entity.

17. The MPLS network of claim 14, wherein the open OS interface is a Java Message Service (JMS) interface.

18. The MPLS network of claim 14, wherein the management entity performs OAM functions on the first PE router, the second PE router, and the third PE router.

19. The MPLS network of claim 14, wherein the first PE router, the second PE router, and the third PE router lack the capability to provide PW tunnel redundancy.

20. The MPLS network of claim 14, wherein the management entity determines an action for a failed PW tunnel based upon a type of service carried by an affected PW tunnel.

* * * * *